(12) United States Patent
Dulloo et al.

(10) Patent No.: US 11,955,249 B2
(45) Date of Patent: Apr. 9, 2024

(54) HEAT PIPE HAVING A WICK BETWEEN CONCENTRIC INNER AND OUTER HOUSINGS, FOR USE IN HEAT REMOVAL FROM A NUCLEAR REACTOR CORE

(71) Applicant: Westinghouse Electric Company LLC, Cranberry Township, PA (US)

(72) Inventors: Abdul R. Dulloo, Sewickley, PA (US); Alex Levinsky, Pittsburgh, PA (US); Richard F. Wright, Greenock, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 643 days.

(21) Appl. No.: 17/084,440

(22) Filed: Oct. 29, 2020

(65) Prior Publication Data

US 2022/0139581 A1    May 5, 2022

(51) Int. Cl.
*G21C 15/257* (2006.01)
*F28D 15/04* (2006.01)
*F28D 21/00* (2006.01)

(52) U.S. Cl.
CPC ......... *G21C 15/257* (2013.01); *F28D 15/046* (2013.01); *F28D 2021/0054* (2013.01)

(58) Field of Classification Search
CPC .............. G21C 15/257; F28D 15/046; F28D 2021/0054

(Continued)

(56) References Cited

U.S. PATENT DOCUMENTS 3,414,475 A   12/1968 Fiebelmann
5,000,252 A *  3/1991 Faghri ............. F28D 20/023
                                                165/41

(Continued)

FOREIGN PATENT DOCUMENTS

JP    2015072223 A    4/2015
TW    201203284 A    1/2012

(Continued)

OTHER PUBLICATIONS

Search Report for corresponding Taiwan Patent Application No. 110140315, dated Jun. 20, 2022.

(Continued)

*Primary Examiner* — Jack W Keith
*Assistant Examiner* — Daniel Wasil
(74) *Attorney, Agent, or Firm* — K&L Gates LLP (57) ABSTRACT

A heat pipe configured to remove heat from a nuclear reactor core is disclosed herein. The heat pipe can include an inner housing defining an inner volume configured to accommodate a heat source and an outer housing configured about the inner housing and the heat source. A wick can be positioned between at least a portion of the inner housing and at least a portion of the outer housing, wherein the wick can include a capillary material, and wherein the wick can define an intermediate volume between the inner housing and the outer housing. A working fluid can be positioned within the intermediate volume, wherein the working fluid can evaporate at a first end of the heat pipe and condense at a second end of the heat pipe adjacent to a heat exchanger, and wherein the wick can return condensed working fluid to the first end of the heat pipe.

8 Claims, 5 Drawing Sheets

(58) Field of Classification Search
USPC .......................................................... 376/367
See application file for complete search history.

(56) References Cited

U.S. PATENT DOCUMENTS

| | | | |
|---|---|---|---|
| 8,000,431 B2* | 8/2011 | Johnson | G21C 5/12 376/412 |
| 8,811,562 B2 | 8/2014 | DeSantis | |
| 10,559,389 B2 | 2/2020 | Sterbentz et al. | |
| 10,991,471 B2 | 4/2021 | Sato et al. | |
| 2016/0329113 A1 | 11/2016 | El-Genk | |
| 2018/0033501 A1 | 2/2018 | Kimura et al. | |
| 2018/0226159 A1 | 8/2018 | Sterbentz et al. | |
| 2019/0206579 A1 | 7/2019 | Liszkai | |
| 2021/0335510 A1* | 10/2021 | Loginov | G21C 15/257 |

FOREIGN PATENT DOCUMENTS

| | | |
|---|---|---|
| TW | 201835940 A | 10/2018 |
| WO | 2015145820 A1 | 10/2015 |

OTHER PUBLICATIONS

International Search Report and Written Opinion for International PCT Application No. PCT/US2021/072105, dated Feb. 23, 2022.

Sun et al., Conceptual design and analysis of a multipurpose micro nuclear reactor power source (Jul. 18, 2018), 121:118-127.

Zhang et al., Conceptual design and analysis of a megawatt power level heat pipe cooled space reactor power system (May 11, 2020), 144:1-18.

International Preliminary Examination on Patentability for PCT Application No. PCT/US2021/072105 dated May 11, 2023.

Search Report for corresponding Taiwan Patent Application No. 111142266, dated Jun. 16, 2023.

* cited by examiner

HEAT PIPE HAVING A WICK BETWEEN CONCENTRIC INNER AND OUTER HOUSINGS, FOR USE IN HEAT REMOVAL FROM A NUCLEAR REACTOR CORE

FIELD

The present disclosure is generally related to nuclear power generation and, more particularly, is directed to improved devices, systems, and methods configured to remove thermal energy from a nuclear reactor core.

SUMMARY

The following summary is provided to facilitate an understanding of some of the innovative features unique to the aspects disclosed herein, and is not intended to be a full description. A full appreciation of the various aspects can be gained by taking the entire specification, claims, and abstract as a whole.

In various aspects, a heat pipe configured to remove heat from a core of a nuclear reactor is disclosed. The heat pipe includes a length and an inner housing with an outer surface, wherein the inner housing defines an inner volume configured to accommodate a heat source. The heat pipe further includes an outer housing with an inner surface configured about the inner housing and the heat source. The heat pipe further includes a wick positioned between the inner housing and the outer housing and extending along at least a portion of the length of the heat pipe, wherein the wick includes a capillary material, wherein the wick is configured to contact at least a portion of the outer surface of the inner housing, wherein the wick is configured to contact at least a portion of the inner surface of the outer housing, and wherein the wick defines an intermediate volume between the inner housing and the outer housing. The heat pipe further includes a working fluid within the intermediate volume, wherein the working fluid is configured to evaporate at a first end of the heat pipe, wherein the working fluid is further configured to condense at a second end of the heat pipe adjacent to a heat exchanger, wherein the wick is configured to return working fluid that has condensed at the second end of the heat pipe to the first end of the heat pipe, and wherein the evaporation and condensation of the working fluid is configured to transfer heat from the first end of the heat pipe to the second end of the heat pipe for dissipation via the heat exchanger.

In various aspects, a unit cell configured to remove heat generated by a nuclear reactor is disclosed. The unit cell includes a core block material and a plurality of devices disposed throughout the core block material. At least one device of the plurality of devices includes a heat pipe including: a length and an inner housing including an outer surface. The inner housing defines an inner volume configured to accommodate a heat source. The heat pipe further includes an outer housing including an inner surface, wherein the outer housing is configured about the inner housing and the heat source. The heat pipe further includes a wick positioned between the inner housing and the outer housing and extending along at least a portion of the length of the heat pipe, wherein the wick includes a capillary material, wherein the wick is configured to contact at least a portion of the outer surface of the inner housing, wherein the wick is configured to contact at least a portion of the inner surface of the outer housing, and wherein the wick defines an intermediate volume between the inner housing and the outer housing. The heat pipe further includes a working fluid within the intermediate volume, wherein the working fluid is configured to evaporate at a first end of the heat pipe, wherein the working fluid is further configured to condense at a second end of the heat pipe adjacent to a heat exchanger, wherein the wick is configured to return working fluid that has condensed at the second end of the heat pipe to the first end of the heat pipe, and wherein the evaporation and condensation of the working fluid is configured to transfer heat from the first end of the heat pipe to the second end of the heat pipe for dissipation via the heat exchanger.

In various aspects, a heat pipe configured to remove heat from a core of a nuclear reactor is disclosed. The heat pipe can include an inner housing defining an inner volume configured to accommodate a heat source and an outer housing configured about the inner housing and the heat source. The heat pipe can further include a wick positioned between at least a portion of the inner housing and at least a portion of the outer housing, wherein the wick includes a capillary material, and wherein the wick defines an intermediate volume between the inner housing and the outer housing. The heat pipe can further include a working fluid within the intermediate volume, wherein the working fluid is configured to evaporate at a first end of the heat pipe, wherein the working fluid is further configured to condense at a second end of the heat pipe adjacent to a heat exchanger, and wherein the wick is configured to return working fluid that has condensed at the second end of the heat pipe to the first end of the heat pipe.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Various features of the aspects described herein are set forth with particularity in the appended claims. The various aspects, however, both as to organization and methods of operation, together with advantages thereof, may be understood in accordance with the following description taken in conjunction with the accompanying drawings as follows:

Corresponding reference characters indicate corresponding parts throughout the several views. The exemplifications set out herein illustrate various aspects of the invention, in one form, and such exemplifications are not to be construed as limiting the scope of the invention in any manner.

DETAILED DESCRIPTION

Numerous specific details are set forth to provide a thorough understanding of the overall structure, function, manufacture, and use of the aspects as described in the disclosure and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the claims. Furthermore, it is to be understood that such terms as "forward", "rearward", "left", "right", "upwardly", "downwardly", and the like are words of convenience and are not to be construed as limiting terms.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Before explaining various aspects of the articulated manipulator in detail, it should be noted that the illustrative examples are not limited in application or use to the details of construction and arrangement of parts illustrated in the accompanying drawings and description. The illustrative examples may be implemented or incorporated in other aspects, variations, and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Also, it will be appreciated that one or more of the following-described aspects, expressions of aspects, and/or examples, can be combined with any one or more of the other following-described aspects, expressions of aspects, and/or examples.

The present disclosure is directed to devices, systems, and methods for removing heat from a nuclear reactor core. The management of thermal energy within a core is important for nuclear reactors. For example, if the core of a nuclear reactor overheats, the reactor may be taken off line for subsequent repair, the usable life of the core can be shortened, and the reactor can become potentially hazardous to operate. The removal of heat from the core of a nuclear reactor becomes even more challenging—and critical—as reactors decrease in size and become more modular.

Some compact reactors function as a "nuclear battery" which uses energy from the fission of nuclear materials (e.g. uranium) to generate electricity. Accordingly, compact reactors can optimize reactor output while reducing reactor size. However, as the size of the reactor is reduced, it becomes increasingly difficult to remove heat from the system. Thermal management within a compact reactor can be accomplished via a configuration of heat pipes. For example, each heat pipe of a compact reactor can include a small amount of a working fluid (e.g. sodium liquid) configured to move heat from the reactor core to a heat exchanger, where it can be utilized to generate electricity. Unlike traditional reactors—which require a large volume of coolant to be pumped through the core—heat pipe-based reactors require a relatively small amount of working fluid, most of which is contained within the wicks of the heat pipes themselves. Accordingly, heat pipe based reactors do not require mechanical pumps, valves, loop piping, and the associated auxiliary systems required to cool a conventional reactor, which further reduces the size of the overall reactor.

As such, heat pipe performance and configuration remain a key design consideration for compact reactors. Since the heat pipes streamline the thermal management system by eliminating the need for auxiliary cooling components, the heat pipe configuration itself becomes a constraint for further reductions in reactor size. Conventional heat pipes include a single tube that defines an inner tube volume filled with working fluid, and a heat source and sink positioned external to the conventional heat pipe. Theoretical research regarding the use of concentric, annular heat pipes with a single wick positioned at the inner heat pipe wall has been performed at Newcastle University. Additionally, annular heat pipes are implemented in Isothermal Furnace Liners, not to transport large amount of heat, but to create a uniform temperature distribution for temperature calibration. None of the aforementioned heat pipes have been proven to effectively remove heat from a compact reactor—let alone remove heat efficiently such that the size of the reactor can be further reduced. Accordingly, there is a need for improved heat pipes that can efficiently remove heat from a compact reactor while reducing their size and overall footprint.

Figure 1:
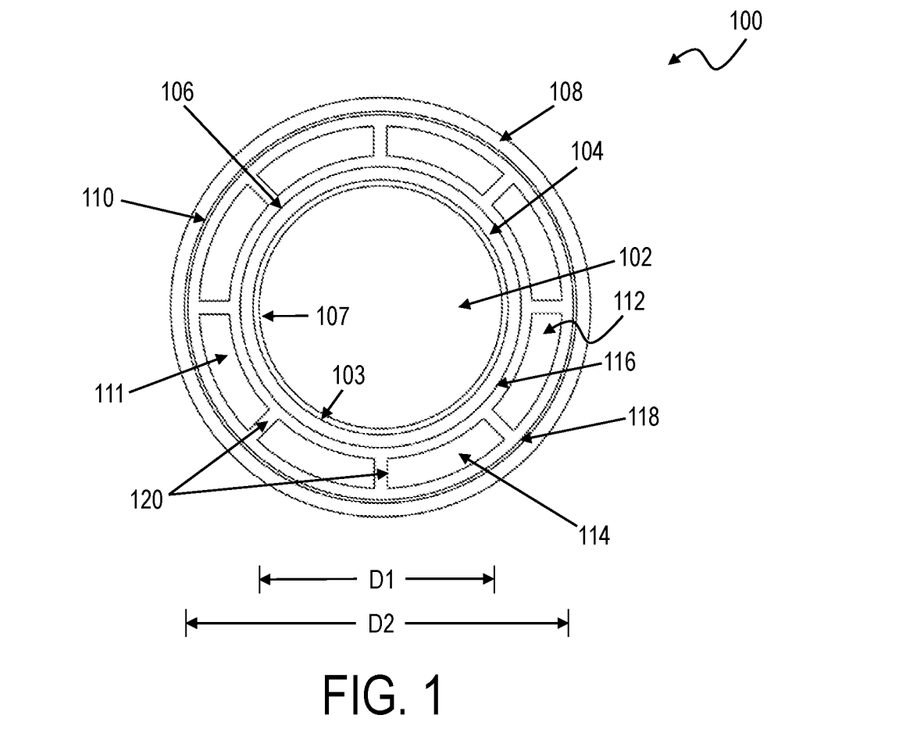
FIG. 1 illustrates a sectioned view of a device configured to remove heat from a core of a nuclear reactor, in accordance with at least one non-limiting aspect of the present disclosure.

Referring now to FIG. 1, a sectioned view of a device 100 configured to remove heat from the core of a nuclear reactor is depicted in accordance with at least one non-limiting aspect of the present disclosure. For example, the device 100 can be a heat pipe configured for implementation within a compact nuclear reactor. According to the non-limiting aspect of FIG. 1, the heat pipe 100 can include an inner housing 104 and an outer housing 108. The inner housing 104 of FIG. 1 can further include an outer surface 106 positioned within the heat pipe 100 such that it faces an inner surface 110 of the outer housing 108. As can be seen in the non-limiting aspect of FIG. 1, the heat pipe 100 can include an annular configuration with a circular outer housing 108 concentrically positioned about a circular inner housing 104. A length of the heat pipe 100 can extend along the centerline about which the inner housing 104 and outer housing 108 are concentrically positioned, thereby forming a tube-like configuration. According to the non-limiting aspect of FIG. 1, the inner housing 104 can include an outer diameter D1 less than an inner diameter D2 of the outer housing 108 to achieve the aforementioned annular configuration. However, it shall be appreciated that the non-limiting circularly configured aspect of FIG. 1 is exclusively presented for illustrative purposes. It shall be appreciated that the term "diameter", as used by the present disclosure, shall include any dimension that extends away from a center point of the device 100. As such, it shall be appreciated that the term "diameter" is not intended to limit the device 100 to a circular configuration.

Although the non-limiting aspect of FIG. 1 depicts a heat pipe 100 with circular, concentrically oriented housings 104, 108, it shall be appreciated that any geometric configuration can be implemented for either the inner housing 104 and outer housing 108. Accordingly, other non-limiting aspects of the present disclosure include an inner housing 104 and outer housing 108 of varying configurations (e.g. square, rectangular, triangular, octagonal). In still other non-limiting aspects, the inner housing 104 can include a first geometric configuration and the outer housing 108 can include a second geometric configuration that is different from the first. For example, the inner housing 104 can include an octagonal configuration and the outer housing 108 can include a circular configuration, such that at least a portion the outer surface 106 of the inner housing 104 is not parallel to a corresponding portion of the inner surface 110 of the outer housing 108.

In further reference to FIG. 1, the inner housing 104 can further define a volume 103 configured to accommodate an internal heat source 102, such that the heat pipe 100 substantially surrounds the heat source 102 when properly inserted within the volume 103. For example, the heat source 102 can include any material configured to generate thermal energy, such as a fuel source (e.g. uranium nitride) or a moderator (e.g. a hydride-based moderator) of the nuclear reactor. Additionally, when properly inserted within the volume 103, the heat source 102 can be positioned adjacent to an inner surface 107 of the inner housing 104. According to some non-limiting aspects, the heat source 102 can be in physical contact with the inner surface 107 of the inner housing 104 when properly inserted. According to other non-limiting aspects, the volume 103 can be filled with an intermediary material configured to enhance heat transfer between heat source 102. Regardless, the interface between the heat source 102 and the heat pipe 100 can be configured to efficiently transfer heat away from the heat source 102.

Still referring to FIG. 1, the heat pipe 100 can further include a wick 112 positioned within the intermediate volume 111 between the inner housing 104 and the outer housing 108. The wick 112 can be configured to contact at least a portion of the outer surface 106 of the inner housing 104 and at least a portion of the inner surface 110 of the outer housing 108. For example, according to the non-limiting aspect of FIG. 1, the wick 112 can include an inner surface 116 positioned in thermal communication with the outer surface 106 of the inner housing 104 and an outer surface 118 positioned in thermal communication with the inner surface 110 of the outer housing 108. In some non-limiting aspects, the surfaces 116, 118 of the wick 112 can be configured to mechanically contact the surfaces 106, 110 of the housings 104, 108. According to the non-limiting aspect of FIG. 1, the wick 112 can further include a plurality of ribs 120 mechanically coupled to at least a portion of the inner surface 116 and outer surface 118 of the wick 112. The plurality of ribs 120 can include either the same or a similar wicking material to the wick 112. However, according to other non-limiting aspects, the ribs 120 can be configured to directly contact the surfaces 106, 110 of the housings 104, 108, themselves. Although the ribs 120 depicted in FIG. 1 extend radially outward from the center of the concentrically oriented inner and outer housing 104, 108, it shall be appreciated that the present disclosure contemplates other non-limiting aspects wherein the ribs 120 are oriented in any number of varying configurations (e.g. zig-zag, circular, cruciform).

According to the non-limiting aspect of FIG. 1, a working fluid (e.g. sodium liquid) can be positioned within the intermediate volume 111 of the heat pipe 100 and the wick 112 can be composed of one or more materials that include capillary properties (e.g. any porous material). The heat pipe 100 can be positioned within the nuclear reactor such that one of its ends is positioned within a condenser of the nuclear reactor. As such, working fluid that has condensed on a cold side of the heat pipe 100 can be returned to a hot side of the heat pipe 100 for evaporation due to the capillary properties of the wick 112, thereby renewing the heat transfer cycle. In other words, the heat pipe 100 of FIG. 1 can be configured to remove heat from the heat source 102 positioned within the heat pipe 100. It shall be appreciated that the integration of the heat source 102, inner housing 104, outer housing 108, and wick 112—when properly positioned relative to and evaporator and condenser of the nuclear reactor—can facilitate the efficient transfer of thermal energy away from the core of the nuclear reactor. Accordingly, the heat pipe 100 of FIG. 1 can more efficiently manage the thermal energy produced by a compact nuclear reactor when compared to known single-tube heat pipe configurations. This can result in improved performance and reliability and result in compact reactors of reduced size.

Figure 2:
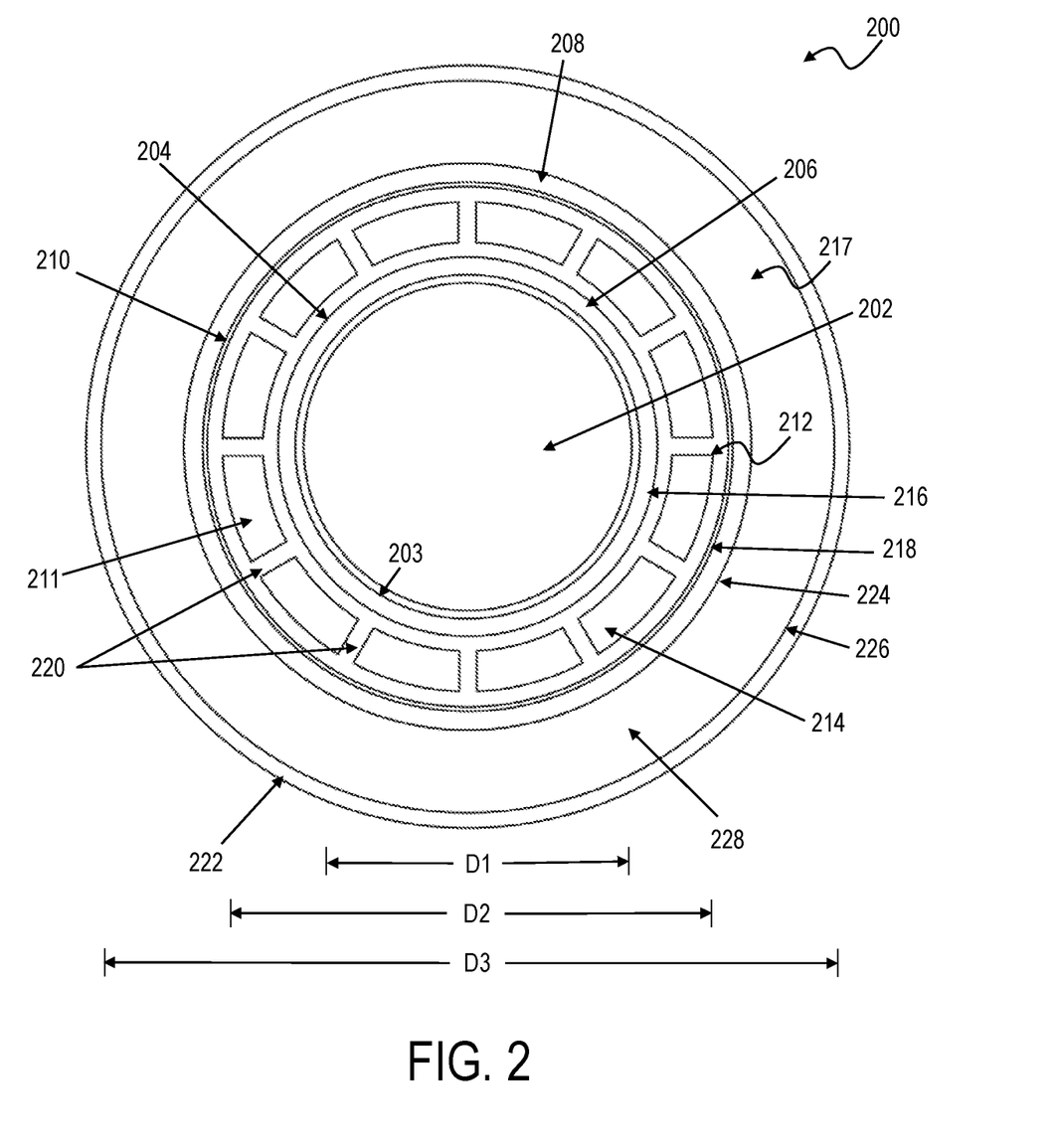
FIG. 2 illustrates a sectioned view of another device configured to remove heat from a core of a nuclear reactor, in accordance with at least one non-limiting aspect of the present disclosure.

Referring now to FIG. 2, a sectioned view of another device 200 configured to remove heat from a core of a nuclear reactor is depicted in accordance with at least one non-limiting aspect of the present disclosure. According to the non-limiting aspect of FIG. 2, the device 200 can be similarly configured to the heat pipe 100 of FIG. 1. For example, the device 200 can include a heat pipe configured for implementation within a nuclear reactor, with an inner housing 204 and an outer housing 208. Similar to the heat pipe 100 of FIG. 1, the inner housing 204 of FIG. 2 can include an outer surface 206 positioned within the heat pipe 200 such that it faces an inner surface 210 of the outer housing 208. Again, the heat pipe 200 can include an annular configuration with a circular outer housing 208 concentrically positioned about a circular inner housing 204, and the heat pipe 200 once again extends in a tube-like configuration. However, the annular configuration of FIG. 2 is intended for illustrative purposes only. Accordingly, in other non-limiting aspects, the heat pipe 200 can include any number of geometrical configurations (e.g. square, rectangular, triangular, octagonal). Regardless, the inner housing 204 can define a volume 203 configured to accommodate an internal heat source 202.

In further reference to the non-limiting aspect of FIG. 2, the heat pipe 200 can further include a cladding layer 222 concentrically oriented about the heat source 202, the inner housing 204, and the outer housing 208. The cladding layer 222 can include a cladding diameter D3 that is greater than the inner diameter D1 and the outer diameter D1, such that the cladding 222 substantially surrounds the components of the heat pipe 200 that were discussed in reference to the heat pipe 100 of FIG. 1. Although the cladding 222 of FIG. 2 includes a circular configuration, it too can include any number of different geometrical configurations, even if the inner housing 204 and outer housing 208 are circular. Regardless, the cladding layer 222 can define a second intermediate volume 217 between an inner surface 226 of the cladding layer 222 and an outer surface 224 of the outer housing 208. For example, the cladding layer 222 can include a thin-walled tube made of a material configured to contain any nuclear material positioned within the heat pipe 200. Accordingly, the cladding layer 222 can be specifically configured to prevent the corrosion of the and thus, prevent the release of detrimental and potentially hazardous materials into an operating environment.

Still referring to FIG. 2, the heat pipe 200 can further include a wick 212 positioned within an intermediate volume 211 defined between the inner housing 204 and the outer housing 208. The wick 212 can be configured to contact at least a portion of the outer surface 206 of the inner housing 204 and at least a portion of the inner surface 210 of the outer housing 208. For example, according to the non-limiting aspect of FIG. 2, the wick 212 can include an inner surface 216 positioned in thermal communication with the outer surface 206 of the inner housing 204 and an outer surface 218 positioned in thermal communication with the inner surface 210 of the outer housing 208. In some non-limiting aspects, the surfaces 216, 218 of the wick 212 can be configured to mechanically contact the surfaces 206, 210 of the housings 204, 208. According to the non-limiting aspect of FIG. 2, the wick 212 can further include a plurality of ribs 220 mechanically coupled to at least a portion of the inner surface 216 and outer surface 218 of the wick 212. The plurality of ribs 220 can include either the same or a similar wicking material to the wick 212. However, according to other non-limiting aspects, the ribs 220 can be configured to directly contact the surfaces 206, 210 of the housings 204, 208, themselves.

Although the ribs 220 depicted in FIG. 2 extend radially outward from the center of the concentrically oriented inner and outer housing 204, 208, it shall be appreciated that the present disclosure contemplates other non-limiting aspects wherein the ribs 220 are oriented in any number of varying configurations (e.g. zig-zag, circular, cruciform).

According to the non-limiting aspect of FIG. 2, a working fluid (e.g. sodium liquid, and/or the like) can be positioned within the intermediate volume 211 of the heat pipe 200 and the wick 212 can be composed of one or more materials that include capillary properties (e.g. any porous material). The heat pipe 200 can be positioned within the nuclear reactor such that one of its ends is positioned within a condenser of the nuclear reactor. As such, working fluid that has condensed on a cold side of the heat pipe 200 can be returned to a hot side of the heat pipe 200 for evaporation due to the capillary properties of the wick 212, thereby renewing the heat transfer cycle. In other words, the heat pipe 200 of FIG. 2 can be configured to remove heat away from the heat source 202 positioned within the heat pipe 200. It shall be appreciated that the integration of the heat source 202, inner housing 204, outer housing 208, and wick 212—when properly positioned relative to and evaporator and condenser of the nuclear reactor—can facilitate the efficient transfer of thermal energy away from the core of the nuclear reactor. Accordingly, the heat pipe 200 of FIG. 2 can more efficiently manage the thermal energy produced by a compact nuclear reactor when compared to known single-tube heat pipe configurations. This can result in improved performance and reliability and result in compact reactors of reduced size.

According to the non-limiting aspect of FIG. 2, the heat pipe 200 of FIG. 2 can include a moderator-type 202 heat source (e.g. hydride-based moderator, and/or the like) positioned within the volume 203, and a fuel 228 (e.g. uranium nitride, and/or the like) positioned within the second intermediate volume 217, as defined by the cladding layer 222. Accordingly, the moderator 202 can be surrounded by the wick 212 of the annular heat pipe 200 and the wick 212 of the annular heat pipe 200 can be surrounded by the annular fuel 228. As such, the heat pipe 200 of FIG. 2 can include multiple heat sources 202, 228 integrated within a heat transfer media, or core block (e.g., graphite, and/or the like), of the nuclear reactor. Accordingly, in the event of a heat pipe 200 failure, adjacent heat pipes 200 can compensate for the failure by transferring excess heat away from the core.

Although the non-limiting aspects of FIGS. 1 and 2 include heat pipes 100, 200 with integrated heat sources 102, 202, the present disclosure contemplates other non-limiting aspects featuring a wide variety of arrangements of the heat pipes 100, 200 and heat sources 102, 202. For example, according to some non-limiting aspects, the wick 212 of the heat pipe 200 of FIG. 2 can be surrounded by a heat source 202, depending on whether the intended application and/or user preference can accommodate for the less efficient use of space. In still other non-limiting aspects, the fuel 228 can be surrounded by the wick 212 of the heat pipe 200 of FIG. 2 and the moderator 202 can be configured to surround the wick 212 of the heat pipe 200. In other words, the position of the fuel 228 and moderator 202 of FIG. 2 can be inverted, depending on whether the intended application and/or user preference can accommodate for less efficient cooling in the event of heat pipe failure. In both aspects, the user might be motivated to optimize other variables at the expense of nuclear reactor size and/or efficiency of heat transfer, which provides the heat pipe 200 design of FIG. 2 with a certain degree of customization. Ultimately, optimization of the heat pipe 200 design depends on the intended application and/or user preference for the nuclear reactor design, both of which are increasing in importance due to the emergence of micro-reactors.

Figure 3:
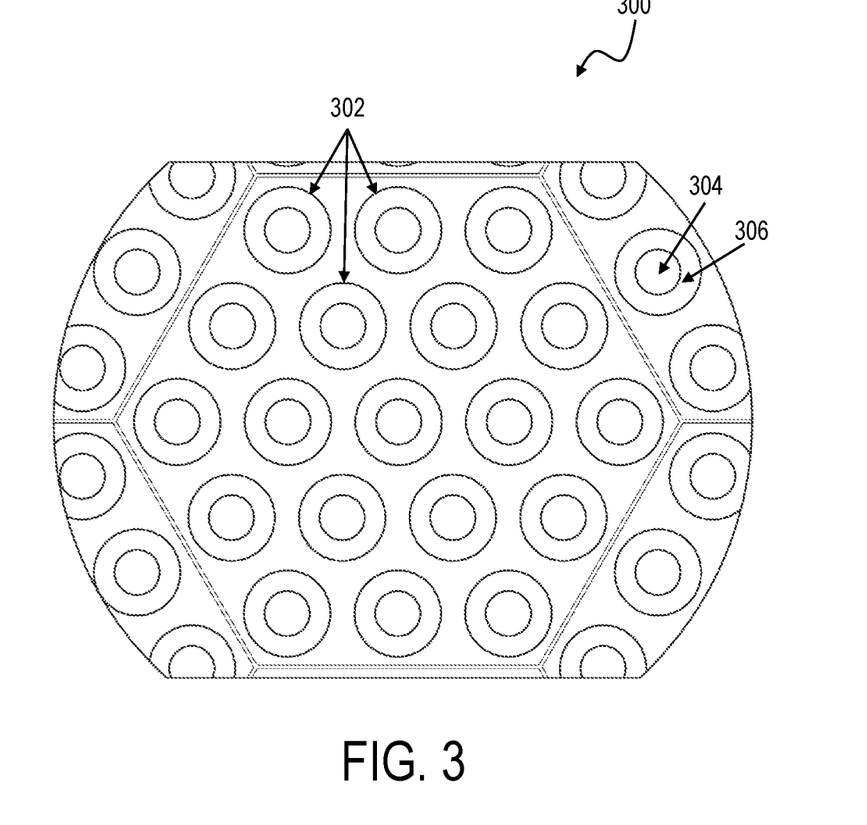
FIG. 3 illustrates a top view of a unit cell including a plurality of devices configured to remove heat from the core of a nuclear reactor, in accordance with at least one non-limiting aspect of the present disclosure.

Referring now to FIG. 3, a top view of a unit cell 300 including a plurality of devices 302 configured to remove heat from the core of a nuclear reactor is depicted in accordance with at least one non-limiting aspect of the present disclosure. It shall be appreciated that, although the unit cell 300 of FIG. 3 includes 19 devices 302, the present disclosure contemplates other non-limiting aspects wherein the unit cell 300 includes any number of devices 302. Additionally and/or alternatively, the hexagonal configuration of the unit cell 300 of FIG. 3 is exclusively presented for illustrative purposes. As such, it shall be appreciated that the unit cell 300 of FIG. 3 can include any number of geometric configurations, depending on the desired output and thermal properties of the core.

According to the non-limiting aspect of FIG. 3, each device 302 of the plurality of devices 302 can be configured to substantially surround an integrated heat source 304 of the core. The heat source 304 can include either a fuel rod, a moderator, or combinations therefor. As was discussed in reference to FIGS. 1 and 2, each device 302 of the plurality of devices 302 can further include an assembly 306 configured to surround the integrated heat source 304. The assembly 306 can include any of the features discussed in reference to FIGS. 1 and 2, including a wick 112, 212 of a heat pipe 100, 200 and/or a plurality of ribs 120, 220 configured to transfer heat away from the integrated heat source 304. According to some non-limiting aspects, the assembly 306 can further include a cladding 222 that defines a second intermediate volume 217 configured to accommodate a fuel 228, as discussed in reference to FIG. 2. In still other non-limiting aspects, each device 302 of the plurality of devices 302 can include a different configuration. For example, a first device 302 can include the device 100 configuration of FIG. 1 and a second device 302 can include the device 200 configuration of FIG. 2.

Still referring to FIG. 3, each device 302 of the unit cell 300 can be particularly arranged to be adjacent to a number of other devices 302. Adjacent devices 302 can be positioned at a predetermined distance from one another, such that thermal energy generated by the integrated heat sources 304 of any given device 302 can be effectively transferred away from the core in the event of a heat pipe failure. Since conventional heat pipes are typically surrounded by the heat sources they are intended to cool, adjacent heat pipes are limited in their ability assist in mitigating temperature increases if a first heat pipe fails. Accordingly, unit cell 300 configuration of FIG. 3 offers a significant improvement and benefit over known devices. Additionally and/or alternatively, the unit cell 300 can include a core block including a material with preferable thermal properties (e.g. graphite) and one or more temperature sensors configured to monitor an operating temperature of the unit cell 300 can be positioned throughout the core of the nuclear reactor. Accordingly, if a heat pipe fails, heat from the integrated heat source 304 can be transferred through the material. The temperature sensors can detect the increase in temperature and determine whether or not it meets or exceeds a predetermined threshold, after which a nuclear reactor shutdown protocol can be commenced.

Figure 4:
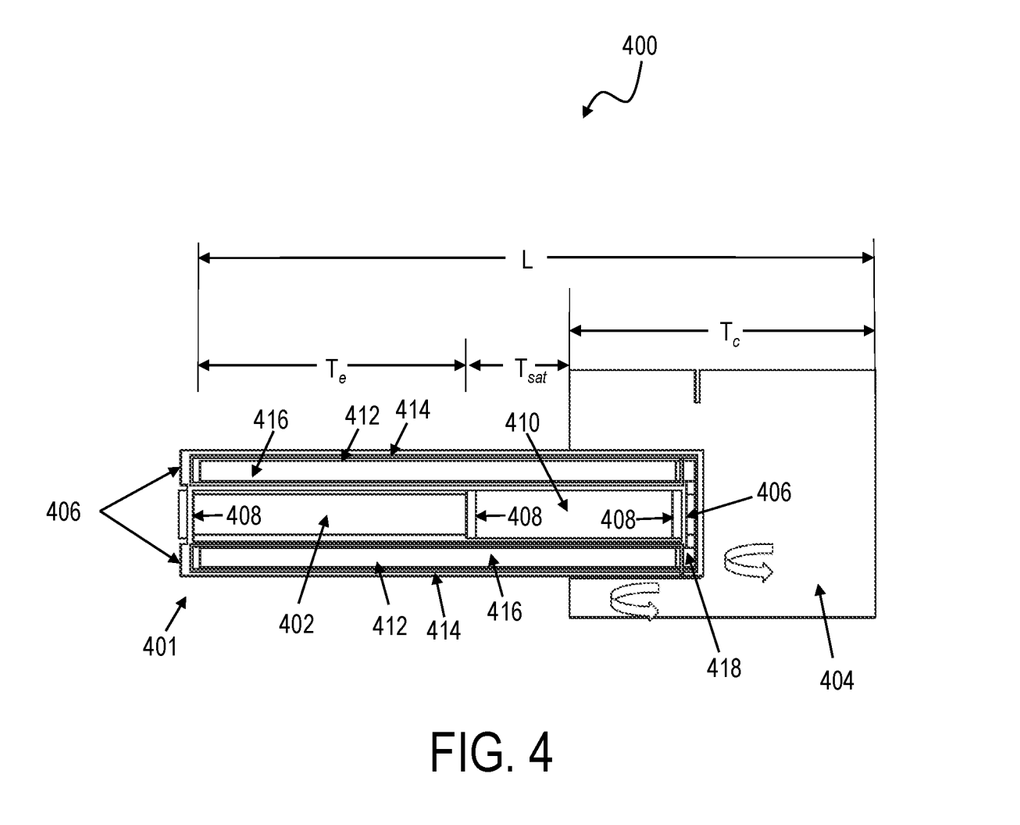
FIG. 4 illustrates a side view of a system configured to remove heat from a core of a nuclear reactor, in accordance with at least one non-limiting aspect of the present disclosure.

Referring now to FIG. 4, a side view of a system 400 configured to remove heat from a core of a nuclear reactor is depicted in accordance with at least one non-limiting aspect of the present disclosure. According to the non-limiting aspect of FIG. 4, the system 400 includes a horizontally oriented device, such as a heat pipe 401, integrated with a condenser 404 of the nuclear reactor. The heat pipe 401 is configured about a heat source 402, such as fuel or a moderator, the length of which defines an evaporating section of the heat pipe 401, which operates at an evaporating temperature $T_e$. The heat pipe 401 can further include one or more internal end caps 408, one of which defines an adiabatic section of the heat pipe 401 that operates at an adiabatic temperature $T_{sat}$. According to some non-limiting aspects, the heat pipe 401 can further include a cover gas 410 positioned within the adiabatic section. The heat pipe 401 can terminate in the condenser 404 of the nuclear reactor, which operates at a condensing temperature $T_c$. According to the non-limiting aspect of FIG. 4, the evaporating temperature $T_e$ is greater than the adiabatic temperature T sat and the adiabatic temperature $T_{sat}$ is greater than the condensing temperature $T_c$. Collectively, the evaporating section, the adiabatic section, and the condensing section of the heat pipe 401 can constitute a length L of the heat pipe 401. Accordingly, a working fluid 416 within the heat pipe 401 can evaporate from the heat generated by the integrated heat source 402, travel the length of the heat pipe 401 through the adiabatic section to the condenser 404, where it is cooled and condenses. The system 400—and more specifically, the heat pipe 401—can be configured to accommodate a small excess of working fluid 418 proximal the condenser to prevent dry out of the heat pipe 401 and its components.

Notably, the heat pipe 401 of FIG. 4 can include external end caps 406, as well as a first external wick 412 and a second internal wick 414. Either the external end caps 406, the internal end caps 408, or both can connect the external wick 412 and the internal wick 414. Alternatively and/or additionally, one or more ribs (e.g. the ribs 120, 220 of devices 100, 200 depicted in FIGS. 1 and 2) can also be configured to connect an external wick 412 and internal wick 414 of the heat pipe 401. Regardless, the external wick 412 and internal wick 414 can cooperate to connect the multiple surfaces of the heat pipe 401, which creates a larger surface area for conduction and convection. Additionally, the connection of the external wick 412 and the internal wick 414 can establish a common volume of the heat pipe 401, while retaining its discrete sections and operating temperatures. This connection can be positioned on a condenser side of the heat pipe 401 for the horizontally configured system 500 of FIG. 5. However, It shall be appreciated that the heat pipe 401 with an integral heat source and/or moderator can provide the foregoing benefits with and without wicks 412, 414, and can be placed in any orientation, including an orientation that uses gravity to move the working fluid within the heat pipe (e.g., a thermosiphon), as will be discussed in further detail with reference to FIG. 5.

Figure 5:
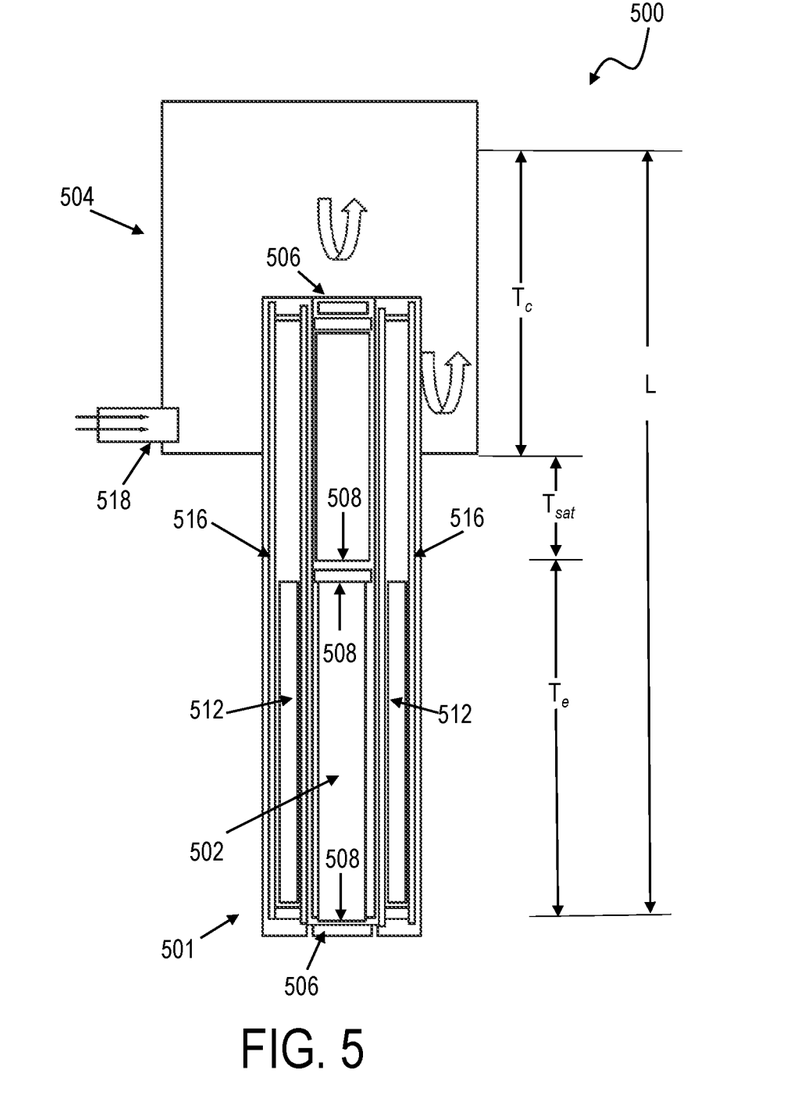
FIG. 5 illustrates a side view of another system configured to remove heat from a core of a nuclear reactor, in accordance with at least one non-limiting aspect of the present disclosure.

Referring now to FIG. 5, a side view of another system 500 configured to remove heat from a core of a nuclear reactor is depicted in accordance with at least one non-limiting aspect of the present disclosure. According to the non-limiting aspect of FIG. 5, the system 500 includes a vertically oriented device, such as a heat pipe 501, integrated with a condenser 504 of the nuclear reactor. The system 500 is similarly configured to the system 400 of FIG. 4. However, the system 500 of FIG. 5 is vertically configured and thus, can operate like a thermosiphon for moving the working fluid 516. The heat pipe 501 is configured about a heat source 502, such as fuel or a moderator, the length of which defines an evaporating section of the heat pipe 501, which operates at an evaporating temperature $T_e$. The heat pipe 501 can further include one or more internal end caps 508, one of which defines an adiabatic section of the heat pipe 501 that operates at an adiabatic temperature $T_{sat}$. According to some non-limiting aspects, the heat pipe 501 can further include a cover gas positioned within the adiabatic section. The heat pipe 501 can terminate in the condenser 504 of the nuclear reactor, which operates at a condensing temperature $T_c$. Collectively, the evaporating section, the adiabatic section, and the condensing section of the heat pipe 501 can constitute a length L of the heat pipe 501. According to the non-limiting aspect of FIG. 5, the evaporating temperature $T_e$ is greater than the adiabatic temperature $T_{sat}$ and the adiabatic temperature $T_{sat}$ is greater than the condensing temperature $T_c$. Accordingly, a working fluid 516 within the heat pipe 501 can evaporate from the heat generated by the integrated heat source 502, travel the length of the heat pipe 501 through the adiabatic section to the condenser 504, where it is cooled and condenses.

In further reference to FIG. 5, the heat pipe 501 can include external end caps 506. However, according to the non-limiting aspect of FIG. 5, the heat pipe can include a wicking feature 512 exclusively positioned within the evaporating section. For example, the wicking feature 512 can include either grooves, a partial wick, and/or the like. For the vertical configuration of FIG. 5, the heat pipe does not require as many wicking features 412, 414 as the horizontally configured system 400 of FIG. 4. This is because gravity can assist in returning condensed working fluid 516 to the evaporator, although the vertically configured system 500 of FIG. 5 may not be ideal for high power reactors.

Once again, either the external end caps 506, the internal end caps 508, or both can connect the wicking features 512 of the heat pipe 501 of FIG. 5. Alternatively and/or additionally, one or more ribs (e.g. the ribs 120, 220 of devices 100, 200 depicted in FIGS. 1 and 2) can be configured to connect the wicking features 512 of the heat pipe 501. Regardless, the wicking features 512 can cooperate to connect the multiple surfaces of the heat pipe 501, which creates a larger surface area for conduction and convection. Additionally, the connection of the wicking features 512 can establish a common volume of the heat pipe 501, while retaining its discrete sections and operating temperatures. Accordingly, the heat pipe 501 can provide the foregoing benefits with reduced wicking features 512 and can function, even when vertically oriented, to move the working fluid 516 within the heat pipe 501 (e.g., a thermosiphon).

Various aspects of the subject matter described herein are set out in the following numbered clauses:

Clause 1: A heat pipe configured to remove heat from a core of a nuclear reactor, wherein the heat pipe includes a length, the heat pipe further including: an inner housing including an outer surface, wherein the inner housing defines an inner volume configured to accommodate a heat source; an outer housing including an inner surface, wherein the outer housing is configured about the inner housing and the heat source; a wick positioned between the inner housing and the outer housing and extending along at least a portion of the length of the heat pipe, wherein the wick includes a capillary material, wherein the wick is configured to contact at least a portion of the outer surface of the inner housing, wherein the wick is configured to contact at least a portion of the inner surface of the outer housing, and wherein the wick defines an intermediate volume between the inner housing and the outer housing; and a working fluid within the intermediate volume, wherein the working fluid is configured to evaporate at a first end of the heat pipe adjacent to a heat source, wherein the working fluid is further configured to condense at a second end of the heat pipe adjacent to a heat exchanger, wherein the wick is configured to return working fluid that has condensed at the second end of the heat pipe to the first end of the heat pipe, and wherein the evaporation and condensation of the working fluid is configured to transfer heat from the first end of the heat pipe to the second end of the heat pipe for dissipation via the heat exchanger.

Clause 2: The heat pipe according to clause 1, wherein the wick includes a plurality of ribs, wherein at least a first rib of the plurality of ribs contacts at least a portion of the outer surface of the inner housing, and wherein at least a second rib of the plurality of ribs contacts at least a portion of the inner surface of the outer housing.

Clause 3: The heat pipe according to clauses 1 or 2, wherein the heat pipe includes a tube configuration, wherein the outer housing and the inner housing each include a circular configuration, wherein the outer housing is concentrically oriented about the inner housing, and wherein the plurality of ribs are configured to extend radially from a center point of the inner housing.

Clause 4: The heat pipe according to any of clauses 1-3, further including an end-cap coupled to the second end of the heat pipe, wherein the second end-cap is configured to mechanically contact the outer housing, the inner housing, and the wick, thereby establishing a thermal circuit that traverses through the inner volume and intermediary volume.

Clause 5: The heat pipe according to any of clauses 1-4, wherein the heat source is a moderator including a hydride.

Clause 6: The heat pipe according to any of clauses 1-5, wherein the heat source is a nuclear radioactive fuel.

Clause 7: The heat pipe according to any of clauses 1-6, wherein the heat source is a moderator, and wherein the heat pipe further includes a cladding configured about the outer housing, wherein the cladding defines a second intermediary volume about the outer housing, and wherein a nuclear fuel is positioned within the second intermediary volume.

Clause 8: The heat pipe according to any of clauses 1-7, further including a reservoir positioned at the second end of the heat pipe, wherein the reservoir is configured to contain an excess amount of working fluid, and wherein the excess amount of working fluid is configured to prevent the heat pipe and its components from drying out.

Clause 9: The heat pipe according to any of clauses 1-8, wherein the heat pipe further includes a vertically oriented thermosiphon configured such that gravity at least partially assists the wick in returning working fluid that has condensed at the second end of the heat pipe to the first end of the heat pipe.

Clause 10: A unit cell configured to remove heat generated by a nuclear reactor, the unit cell including: a core block material; and a plurality of devices disposed throughout the core block material, wherein at least one device of the plurality of devices includes a heat pipe including: a length; an inner housing including an outer surface, wherein the inner housing defines an inner volume configured to accommodate a heat source; an outer housing including an inner surface, wherein the outer housing is configured about the inner housing and the heat source; a wick positioned between the inner housing and the outer housing and extending along at least a portion of the length of the heat pipe, wherein the wick includes a capillary material, wherein the wick is configured to contact at least a portion of the outer surface of the inner housing, wherein the wick is configured to contact at least a portion of the inner surface of the outer housing, and wherein the wick defines an intermediate volume between the inner housing and the outer housing; and a working fluid within the intermediate volume, wherein the working fluid is configured to evaporate at a first end of the heat pipe, wherein the working fluid is further configured to condense at a second end of the heat pipe adjacent to a heat exchanger, wherein the wick is configured to return working fluid that has condensed at the second end of the heat pipe to the first end of the heat pipe, and wherein the evaporation and condensation of the working fluid is configured to transfer heat from the first end of the heat pipe to the second end of the heat pipe for dissipation via the heat exchanger.

Clause 11: The unit cell according to claim 10, wherein the core block material includes graphite.

Clause 12: The unit cell according to clauses 10 or 11, wherein the wick includes a plurality of ribs, wherein at least a first rib of the plurality of ribs contacts at least a portion of the outer surface of the inner housing, and wherein at least a second rib of the plurality of ribs contacts at least a portion of the inner surface of the outer housing.

Clause 13: The unit cell according to any of clauses 10-12, wherein the heat pipe includes a tube configuration, wherein the outer housing and the inner housing each include a circular configuration, wherein the outer housing is concentrically oriented about the inner housing, and wherein the plurality of ribs are configured to extend radially from a center point of the inner housing.

Clause 14: The unit cell according to any of clauses 10-13, wherein the heat pipe further includes an end-cap coupled to the second end of the heat pipe, wherein the second end-cap is configured to mechanically contact the outer housing, the inner housing, and the wick, thereby establishing a thermal circuit that traverses through the inner volume and intermediary volume.

Clause 15: The unit cell according to any of clauses 11-14, wherein the heat source is a moderator, and wherein the heat pipe further includes a cladding configured about the outer housing, wherein the cladding defines a second intermediary volume about the outer housing, and wherein a nuclear fuel is positioned within the second intermediary volume.

Clause 16: The unit cell according to any of clauses 11-15, further including a reservoir positioned at the second end of the heat pipe, wherein the reservoir is configured to contain an excess amount of working fluid, and wherein the excess amount of working fluid is configured to prevent the heat pipe and its components from drying out.

Clause 17: The unit cell according to any of clauses 11-16, wherein the heat pipe further includes a vertically oriented thermosiphon configured such that gravity at least partially assists the wick in returning working fluid that has condensed at the second end of the heat pipe to the first end of the heat pipe.

Clause 18: A heat pipe configured to remove heat from a core of a nuclear reactor, the heat pipe including: an inner housing defining an inner volume configured to accommodate a heat source; an outer housing configured about the inner housing and the heat source; a wick positioned between at least a portion of the inner housing and at least a portion of the outer housing, wherein the wick includes a capillary material, and wherein the wick defines an intermediate volume between the inner housing and the outer housing; and a working fluid within the intermediate volume, wherein the working fluid is configured to evaporate at a first end of the heat pipe, wherein the working fluid is further configured to condense at a second end of the heat pipe adjacent to a heat exchanger, and wherein the wick is configured to return working fluid that has condensed at the second end of the heat pipe to the first end of the heat pipe.

Clause 19: The heat pipe according to clause 18, wherein the wick includes a plurality of ribs, wherein at least a first rib of the plurality of ribs contacts at least a portion of the inner housing, and wherein at least a second rib of the plurality of ribs contacts at least a portion of the outer housing.

Clause 20: The method according to clauses 18 or 19, wherein the heat pipe includes a tube configuration, wherein the outer housing and the inner housing each include a circular configuration, wherein the outer housing is concentrically oriented about the inner housing, and wherein the plurality of ribs are configured to extend radially from a center point of the inner housing.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative aspects. The aspects described herein are understood as providing illustrative features of varying detail of various aspects of the disclosed invention; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the disclosed invention. Accordingly, it will be recognized by persons having ordinary skill in the art that various substitutions, modifications or combinations of any of the exemplary aspects may be made without departing from the scope of the invention. In addition, persons skilled in the art will recognize, or be able to ascertain using no more than routine experimentation, many equivalents to the various aspects of the invention described herein upon review of this specification. Thus, the invention is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 100" includes all sub-ranges between (and including) the recited minimum value of 1 and the recited maximum value of 100, that is, having a minimum value equal to or greater than 1 and a maximum value equal to or less than 100. Also, all ranges recited herein are inclusive of the end points of the recited ranges. For example, a range of "1 to 100" includes the end points 1 and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

What is claimed is:

1. A unit cell configured to remove heat generated by a nuclear reactor, the unit cell comprising:
   a core block material; and
   a plurality of devices disposed throughout the core block material, wherein at least one device of the plurality of devices comprises a heat pipe comprising:
      a length;
      an inner housing comprising an outer surface, wherein the inner housing defines an inner volume configured to accommodate a heat source;
      an outer housing comprising an inner surface, wherein the outer housing is configured about the inner housing and the heat source;
      a wick positioned between the inner housing and the outer housing and extending along at least a portion of the length of the heat pipe, wherein the wick comprises a capillary material, wherein the wick is configured to contact at least a portion of the outer surface of the inner housing, wherein the wick is configured to contact at least a portion of the inner surface of the outer housing, and wherein the wick defines an intermediate volume between the inner housing and the outer housing; and
      a working fluid within the intermediate volume, wherein the working fluid is configured to evaporate at a first end of the heat pipe, wherein the working fluid is further configured to condense at a second end of the heat pipe, wherein the wick is configured to return working fluid that has condensed at the second end of the heat pipe to the first end of the heat pipe, and wherein the evaporation and condensation of the working fluid is configured to transfer heat from the first end of the heat pipe to the second end of the heat pipe for dissipation.

2. The unit cell of claim 1, wherein the core block material comprises graphite.

3. The unit cell of claim 1, wherein the wick comprises a plurality of ribs, wherein at least a first rib of the plurality of ribs contacts at least a portion of the outer surface of the inner housing, and wherein at least a second rib of the plurality of ribs contacts at least a portion of the inner surface of the outer housing.

4. The unit cell of claim 3, wherein the heat pipe comprises a tube configuration, wherein the outer housing and the inner housing each comprise a circular configuration, wherein the outer housing is concentrically oriented about the inner housing, and wherein the plurality of ribs are configured to extend radially from a center point of the inner housing.

5. The unit cell of claim 1, wherein the heat pipe further comprises an end-cap coupled to the second end of the heat pipe, wherein the second end-cap is configured to mechanically contact the outer housing, the inner housing, and the wick, thereby establishing a thermal circuit that traverses through the inner volume and intermediary volume.

6. The unit cell of claim 1, wherein the heat pipe further comprises a cladding configured about the outer housing, wherein the cladding defines a second intermediary volume about the outer housing, and wherein a nuclear fuel is positioned within the second intermediary volume.

7. The unit cell of claim 1, wherein the heat pipe is configured to contain an excess amount of working fluid, and wherein the excess amount of working fluid is configured to prevent the heat pipe and its components from drying out.

8. The unit cell of claim 1, wherein the heat pipe is configured as a vertically oriented thermosiphon configured such that gravity at least partially assists the wick in returning working fluid that has condensed at the second end of the heat pipe to the first end of the heat pipe.

* * * * *